(12) United States Patent
Shi et al.

(10) Patent No.: US 9,014,214 B2
(45) Date of Patent: Apr. 21, 2015

(54) DYNAMIC LINK ADJUSTMENT METHOD AND LINK MANAGING DEVICE

(71) Applicant: Huawei Technologies Co., Ltd., Shenzhen, Guangdong (CN)

(72) Inventors: Yongjie Shi, Shenzhen (CN); Tao Lin, Shenzhen (CN); Shuangwu Xu, Shenzhen (CN); Yanxi Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 119 days.

(21) Appl. No.: 13/961,423

(22) Filed: Aug. 7, 2013

(65) Prior Publication Data
US 2014/0044138 A1 Feb. 13, 2014

(30) Foreign Application Priority Data

Aug. 13, 2012 (CN) .......................... 2012 1 0286561

(51) Int. Cl.
*H04J 3/06* (2006.01)
*H04L 7/10* (2006.01)
*H04L 25/14* (2006.01)

(52) U.S. Cl.
CPC .................. *H04J 3/0605* (2013.01); *H04L 7/10* (2013.01); *H04L 25/14* (2013.01)

(58) Field of Classification Search
None
See application file for complete search history.

(56) References Cited

U.S. PATENT DOCUMENTS

| 6,618,395 | B1 | 9/2003 | Kimmitt | |
|---|---|---|---|---|
| 7,570,724 | B1 * | 8/2009 | Saha et al. | 375/365 |
| 7,965,804 | B2 * | 6/2011 | Saha et al. | 375/365 |
| 2006/0092969 | A1 | 5/2006 | Susnow et al. | |
| 2008/0285443 | A1 * | 11/2008 | Connolly et al. | 370/229 |
| 2014/0093022 | A1 | 4/2014 | Shi et al. | |

FOREIGN PATENT DOCUMENTS

| CN | 102257849 A | 11/2011 |
|---|---|---|
| WO | WO 2011094211 A2 | 8/2011 |

* cited by examiner

*Primary Examiner* — Hong Cho
(74) *Attorney, Agent, or Firm* — Leydig, Voit & Mayer, Ltd.

(57) ABSTRACT

A receiving-side chip is disclosed according to the present invention, which includes a processor, configured to acquire and execute following instructions: receiving link information sent by a sending-side chip, and enabling, according to the link information, a SerDes link to be added; receiving padding data from the added SerDes link according to a short unit frame period to acquire a synchronization word, and determining, according to the synchronization word, whether the added SerDes link has been synchronized; switching a read period of data in the added SerDes link from the short unit frame period into a long unit frame period, and aligning the data of the added SerDes link with the data of an original SerDes link; and receiving service data over the added SerDes link and the original SerDes link.

10 Claims, 2 Drawing Sheets

DYNAMIC LINK ADJUSTMENT METHOD AND LINK MANAGING DEVICE

CROSS-REFERENCE TO RELATED APPLICATIONS

This application claims priority to Chinese Patent Application No. 201210286561.3, filed on Aug. 13, 2012, which is hereby incorporated by reference in its entirety.

TECHNICAL FIELD

Embodiments of the present invention relate to a dynamic link adjustment method and a link management device in network communication transmission.

BACKGROUND

With the development of services such as 3G services and broadband services, a continuously increasing requirement on network bandwidth leads to a continuously increasing requirement on the bandwidth for interface processing between devices and between chips, and under many circumstances, the requirement on the bandwidth for interfaces has exceeded 100 Gbps. In this case, even each single link of the currently common high speed serial link SerDes provides a bandwidth over 10 Gbps, the requirement cannot be satisfied. At present, the commonly used solution is to adopt multiple SerDes (Serializer and Deserializer, serializer and deserializer) links to transmit data in parallel, for example, in order to achieve a bandwidth of 100 Gbps, 10 SerDes links each having a bandwidth of 10 Gbps are used to transmit data in parallel. However, with the continuous development of services, SerDes links configured in advance are still facing challenges, and therefore dynamic adjustment on the SerDes links is required between network devices, that is, enabling links when the demanded bandwidth increases.

During the dynamic adjustment, in order to ensure the accuracy of communication transmission, a series of operations such as synchronization and alignment need to be performed for the links according to the content of a preset protocol. However, all those operations cost a long time, thereby causing a large network delay.

SUMMARY

The present invention provides a link adjustment method, including:

sending, by a sending side, link information to a receiving side;

enabling, by the receiving side according to the link information, a SerDes link to be added;

sending, by the sending side according to a short unit frame period, padding data to the receiving side over the added SerDes link, and adding a synchronization word into the padding data;

searching, by the receiving side according to the short unit frame period, for the synchronization word in the added SerDes link, and determining, according to the synchronization word, whether the added SerDes link is synchronized;

when the receiving side determines that the added SerDes link has been synchronized, feeding back, by the receiving side, a response, indicating that the added link has been synchronized, to the sending side;

inserting, by the sending side, alignment words to an original SerDes link and the added SerDes link, switching, by the receiving side according to the alignment word, a read period of data in the added SerDes link from the short unit frame period to a long unit frame period, and aligning the data of the added SerDes link with data of the original SerDes link; and sending, by the sending side, service data to the receiving side over the added SerDes link according to the long unit frame period.

The present invention further provides a sending-side chip. The sending-side chip includes a processor, configured to acquire and execute the following instructions:

sending service data to a receiving-side chip over an original SerDes link according to a long unit frame period;

determining a SerDes link to be added;

sending link information to the receiving-side chip over the original SerDes link, where the link information is used to notify the receiving-side chip of information of the SerDes link to be added;

sending padding data to the receiving-side chip over the added SerDes link according to a short unit frame period, and adding a synchronization word into the padding data, so that the receiving-side chip synchronizes the added SerDes link;

receiving a feedback which is fed back by the receiving-side chip and indicates that the added SerDes link has been synchronized, inserting alignment words into the original SerDes link and the added SerDes link, so that the receiving-side chip aligns the original SerDes link with the added SerDes link; and sending, according to the long unit frame period, service data to the receiving-side chip over the original SerDes link and the added SerDes link.

The present invention further provides a receiving-side chip. The receiving-side chip includes a processor, configured to acquire and execute the following instructions:

receiving link information sent by a sending-side chip, and enabling, according to the link information, a SerDes link to be added;

receiving padding data from the added SerDes link according to a short unit frame period to acquire a synchronization word, determining, according to the synchronization word, whether the added SerDes link has been synchronized, and sending a feedback to the sending-side chip when determining that the added SerDes link has been synchronized;

reading alignment words, inserted by the sending side, from the original SerDes link and the added SerDes link, switching a read period of data in the added SerDes link from the short unit frame period into a long unit frame period, and aligning the data of the added SerDes link with data of the original SerDes link according to the alignment words;

sending, to the sending-side chip, a feedback indicating that the added SerDes link has been aligned with the original SerDes link, and receiving service data over the added SerDes link and the original SerDes link.

By adopting a real-time manner according to the present invention, the short unit frame period is used for synchronizing the added SerDes link, thereby shortening the time required from starting synchronizing the added SerDes link to formally sending the service data.

BRIEF DESCRIPTION OF DRAWING

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from the accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
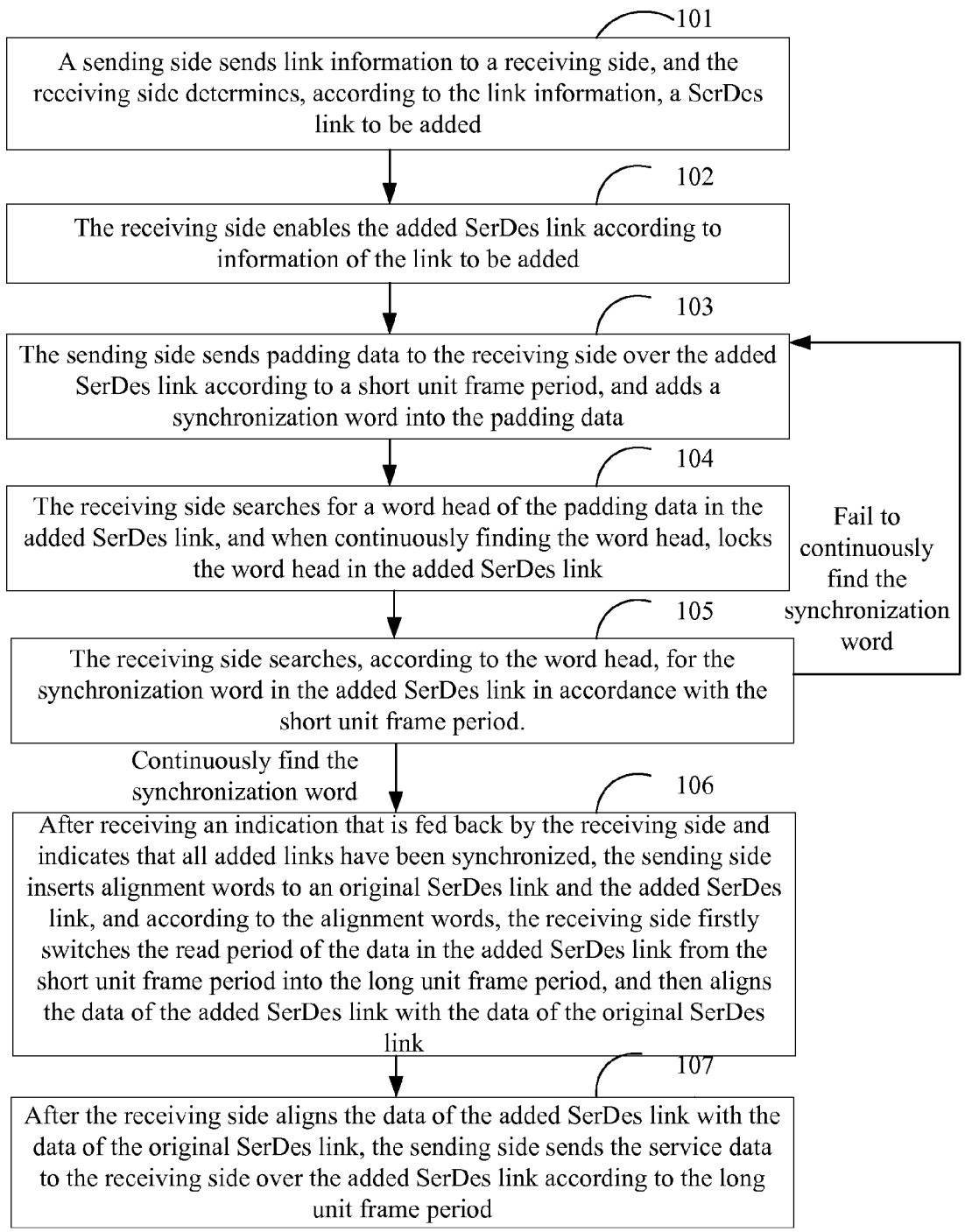
FIG. 1 is a schematic diagram of a link adjustment method according to an embodiment of the present invention.

FIG. 1 is a schematic diagram of a link adjustment method according to an embodiment of the present invention. In the embodiment of the present invention, the link adjustment method includes:

Step 101: A sending side sends link information to a receiving side, and the receiving side determines, according to the link information, a SerDes link to be added.

In the embodiment of the present invention, the sending side and the receiving side may be two chips interconnected by using an Interlaken interface.

In a specific embodiment, the link information may be the total number of required SerDes links. The sending side inserts the total number of required SerDes links into a control word transmitted over an original SerDes link. The receiving side compares the total number of required SerDes links with the number of original SerDes links, if the total number of required SerDes links is greater than the number of original SerDes links, the receiving side determines to add corresponding SerDes links, and determines, according to a preset rule, interfaces corresponding to the added SerDes links. Of course, if the total number of required SerDes links is smaller than the number of original SerDes links, it indicates that corresponding SerDes links need to be removed.

Step 102: The receiving side enables the added SerDes link according to information of the link to be added.

In the embodiment of the present invention, assuming that there are N original SerDes links (the original SerDes links 1-N as shown in the drawing) between the sending side and the receiving side, the sending side sends link addition information to the receiving side, indicating that M SerDes links (the new links 1-M as shown in the drawing) are to be added. After receiving the link addition information, the receiving side enables interfaces for the M new links.

Step 103: The sending side sends padding data to the receiving side over the added SerDes link according to a short unit frame period, and adds a synchronization word into the padding data.

While sending the padding data to the receiving side over the added SerDes link, the sending side is still sending valid service data to the receiving side over the N original SerDes links. In the embodiment of the present invention, the format of the service data sent by the sending side to the receiving side over the N original SerDes links may be set as specified in an Interlaken protocol, and while sending the service data to the receiving side over the N original SerDes links, the sending side also needs to insert synchronization words to the N original SerDes links, so as to maintain the synchronization of the original SerDes links. It should be noted here that, according to the requirement of the Interlaken protocol, the service data of the original SerDes links is all sent according to a long unit frame period.

In the embodiment of the present invention, the long unit frame period and the short unit frame period are two relative concepts for indicating that the period length of the short unit frame period is shorter than the period length of the long unit frame period. In a practical application, the specific length of the long unit frame period may be set according to the requirement of a protocol such as an Interlaken protocol. The added SerDes link adopts the short unit frame period shorter than the long unit frame period. In the embodiment of the present invention, the long unit frame period may be set as 2048 words according to the requirement of the Interlaken protocol, and the short unit frame period may be set as eight words, where a length of each word is 67 bits. It can be set at the receiving side that, when the sending side proposes to add a SerDes link, an initial unit frame period for receiving data by the receiving side over the added SerDes link is the short unit frame period.

Step 104: The receiving side searches for a word head of the padding data in the added SerDes link, and when continuously finding the word head, locks the word head in the added SerDes link.

The padding data and the service data have the same format and both have a fixed length, and both includes portions such as a word head and a load, and their respective word heads both include a preset characteristic string. In the embodiment of the present invention, if the word head is continuously found, no data abnormality exists in the added SerDes link, and the word head of the padding data in the added SerDes link can be locked according to the length of a short unit frame, so that a location of a function word (for example, a synchronization word) of data in the added SerDes link can be determined according to the word head.

In the embodiment of the present invention, locking the word head in the added SerDes link refers to determining a location of a word head of padding data of each unit frame in the added SerDes link according to the found word head and the short unit frame period length.

Step 105: The receiving side searches, according to the word head, for the synchronization word in the added SerDes link in accordance with the short unit frame period. If the synchronization word is continuously found in a predetermined interval, it indicates that the added SerDes link has been synchronized, and the receiving side feeds back, to the sending side, a response indicating that the added link has been synchronized; if the synchronization word is never continuously found in the predetermined interval, the added SerDes link fails to be synchronized, and step 103 is performed again.

In the embodiment of the present invention, continuously finding the synchronization word in the predetermined interval refers to continuously finding the synchronization word according to the requirement of preset times in the scope of a predetermined duration or the number of unit frames. The number of preset times may be 2 or more.

Step 106: After receiving an indication that is fed back by the receiving side and indicates that all added links have been synchronized, the sending side inserts alignment words to the original SerDes link and the added SerDes link, and according to the alignment words, the receiving side firstly switches the read period of the data in the added SerDes link from the short unit frame period into the long unit frame period, and then aligns the data of the added SerDes link with the data of the original SerDes link.

In this case, the original SerDes link is still sending service data normally, and the alignment word inserted into the original SerDes link is actually inserted into the control word of the service data.

Step 107: After the receiving side aligns the data of the added SerDes link with the data of the original SerDes link, the sending side sends the service data to the receiving side over the added SerDes link according to the long unit frame period.

The implementation manner of the present invention is compatible with each existing interface protocol. During the synchronization operation of the added SerDes link, the short unit frame period is adopted, thereby shortening the time required from starting synchronizing the added SerDes link to formally sending the service data. Moreover, when a SerDes link is added, the synchronization and alignment of the added SerDes link may not affect the normal sending of the service data of the original SerDes link.

In Step 106, because the receiving side takes the "continuously receiving the preset number of synchronization words" as a signal for switching the unit frame period of data receiving in the added SerDes link from the short unit frame period to the long unit frame period, in order to shorten this process, the sending side may first continuously send a number of alignment words in a short period in the process of sending alignment words, so that the receiving side can continuously receive the preset number of alignment words more quickly, so as to implement the switching from the "short unit frame period" to the "long unit frame period" more quickly. After the completion of the switching, alignment words are sent according to a normal period of sending alignment words, so that the receiving side aligns the added SerDes link with the original SerDes link. Of course, in order to accelerate the alignment process, the shorter the period of sending alignment words, the better. However, because a control word of a fixed length needs to be sent in each unit frame period, the period of sending alignment words cannot be less than four words.

The above is an implementation solution for dynamically adding the SerDes link. When it is necessary to reduce the number of SerDes links, because each SerDes link has been in a synchronous and aligned state, it is only necessary to insert a padding word into a to-be-closed SerDes link; and dynamically closing the SerDes link can be implemented as long as the sending side completes an action of sending the service data over the remaining SerDes links only.

It should be noted that, the solution of the present invention is not merely applicable to chips on both ends conforming to an Interlaken interface protocol, and can be applied in all scenarios of data parallel transmission using multiple SerDes links, such as a PCI-E protocol and an Infiniband interface protocol.

Figure 2:
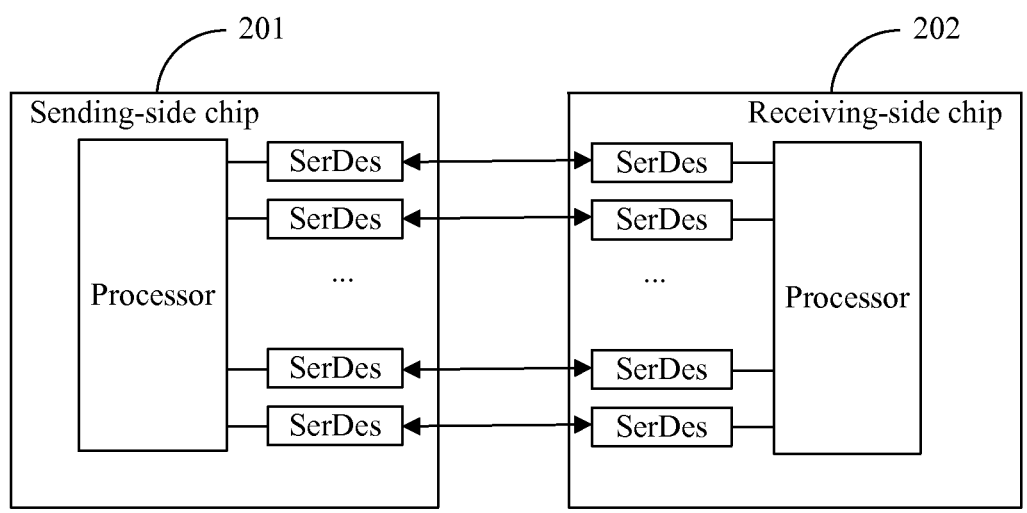
FIG. 2 is a schematic diagram of a communication system of a sending-side chip and a receiving-side chip according to an embodiment of the present invention.

FIG. 2 is a schematic diagram of a communication system according to an embodiment of the present invention. The communication system includes a sending-side chip 201 and a receiving-side chip 202 performing communication based on an Interlaker interface protocol. The sending-side chip 201 and the receiving-side chip 202 both include a processor, configured to cooperate to execute the above link adjustment method.

Specifically, the processor 2012 in the sending-side chip 201 is configured to acquire and execute the following instructions:

sending service data to the receiving-side chip over an original SerDes link according to a long unit frame period;

determining a SerDes link to be added;

sending link information to the receiving-side chip over the original SerDes link, where the link information is used to notify the receiving-side chip of information of the SerDes link to be added;

sending padding data to the receiving-side chip over the added SerDes link according to a short unit frame period, and adding a synchronization word into the padding data, so that the receiving-side chip synchronizes the added SerDes link;

receiving a feedback which is fed back by the receiving-side chip and indicates that the added SerDes link has been synchronized, inserting alignment words into the original SerDes link and the added SerDes link, so that the receiving-side chip aligns the original SerDes link with the added SerDes link;

when the receiving-side chip has completed the alignment between the original SerDes link and the added SerDes link, sending the service data to the receiving-side chip over the original SerDes link and the added SerDes link according to the long unit frame period.

The processor 2022 in the receiving-side chip 202 is configured to acquire and execute the following instructions:

receiving link information sent by the sending-side chip, and enabling, according to the link information, a SerDes link to be added;

receiving padding data from the added SerDes link according to a short unit frame period, and searching for a word head of the padding data, and when continuously finding the word head, locking the word head in the added SerDes link;

according to the word head in the added SerDes link, searching for the synchronization word, inserted by the sending-side chip, in the added SerDes link, and if the synchronization word is continuously found in a predetermined interval, feeding back, to the sending side, a response indicating that the added link has been synchronized;

reading, from the added SerDes link and the original SerDes link, the alignment words inserted by the sending-side chip, switching a read period of data in the added SerDes link from the short unit frame period into a long unit frame period, and then aligning the data of the added SerDes link with data of the original SerDes link;

sending, to the sending-side chip, a feedback indicating that the added SerDes link has been aligned with the original SerDes link, and receiving service data over the added SerDes link and the original SerDes link.

With the link adjustment method, the sending-side chip, and the receiving-side chip according to the embodiments of the present invention, because synchronization of SerDes links is performed according to a short unit frame period, the efficiency of synchronization is higher.

Besides, it should be noted that, with the link adjustment method, the sending-side chip, and the receiving-side chip according to the embodiments of the present invention, the sending of service data may not be interrupted by the effect of adding a new SerDes link. It should be noted that, the solution of the present invention is not merely applicable to chips on both ends conforming to an Interlaken interface protocol, and can be applied in all scenarios of data parallel transmission using multiple SerDes links, such as a PCI-E protocol and an Infiniband interface protocol.

The foregoing description is merely about specific embodiments of the present invention, but is not intended to limit the protection scope of the present invention. Any variation or replacement readily figured out by persons skilled in the art within the technical scope of the present invention shall fall within the protection scope of the present invention. Therefore, the protection scope of the present invention shall be subject to the protection scope of the claims.

What is claimed is:

1. A link adjustment method, comprising:
receiving, by a receiving side, link information from a sending side;
enabling, by the receiving side according to the link information, a Serializer/Deserializer (SerDes) link to be added;
receiving, by the receiving side, padding data from the sending side according to a short unit frame period over the added SerDes link, wherein a synchronization word is added into the padding data;
searching, by the receiving side according to the short unit frame period, for the synchronization word in the added SerDes link, and determining, according to the synchronization word, whether the added SerDes link is synchronized;
when the receiving side determines that the added SerDes link has been synchronized, feeding back, by the receiving side, a response, indicating that the added link has been synchronized to the sending side;
switching, by the receiving side according to alignment words inserted to an original SerDes link and the added SerDes link, a read period of data in the added SerDes link from the short unit frame period into a long unit frame period, and aligning the data of the added SerDes link with data of the original SerDes link;
receiving, by the receiving side, service data from the sending side according to the long unit frame period over the added SerDes link.

2. The link adjustment method according to claim 1, wherein the synchronization word is added into a control word of the padding data.

3. The link adjustment method according to claim 1, wherein the searching, by the receiving side according to the short unit frame period, for the synchronization word in the added SerDes link comprises:
locking, by the receiving side, a word head in the added SerDes link; and
searching, by the receiving side according to the word head in the SerDes link, for the synchronization word in the added SerDes link in accordance with the short unit frame period.

4. The link adjustment method according to claim 1, wherein the link information is a total number of currently required SerDes links, and the enabling, by the receiving side according to the link information, the SerDes link to be added comprises:
comparing, by the receiving side, the total number of currently required SerDes links with a number of actually applied SerDes links, and when the total number of currently required SerDes links is greater than the number of actually applied SerDes links, determining that corresponding SerDes links need to be added.

5. A sending-side chip, comprising a processor, configured to acquire and execute following instructions:
sending service data to a receiving-side chip over an original Serializer/Deserializer (SerDes) link according to a long unit frame period;
determining a SerDes link to be added;
sending link information to the receiving-side chip over the original SerDes link, wherein the link information is used to notify the receiving-side chip of information of the SerDes link to be added;
sending padding data to the receiving-side chip over the added SerDes link according to a short unit frame period, and adding a synchronization word into the padding data, so that the receiving-side chip synchronizes the added SerDes link;
receiving a feedback which is fed back by the receiving-side chip and indicates that the added SerDes link has been synchronized, inserting alignment words into the original SerDes link and the added SerDes link, so that the receiving-side chip aligns the original SerDes link with the added SerDes link; and
sending the service data to the receiving-side chip over the original SerDes link and the added SerDes link according to the long unit frame period.

6. The sending-side chip according to claim 5, wherein the link information is a total number of currently required SerDes links.

7. The sending-side chip according to claim 5, wherein the sending padding data to the receiving side over the added SerDes link according to the short unit frame period, and adding a synchronization word into the padding data comprise:
inserting, by the sending side, the synchronization word into a control word of the padding data.

8. A receiving-side chip, comprising a processor, configured to acquire and execute following instructions:
receiving link information sent by a sending-side chip, and enabling, according to the link information, a Serializer/Deserializer (SerDes) link to be added;
receiving padding data from the added SerDes link according to a short unit frame period to acquire a synchronization word, determining, according to the synchronization word, whether the added SerDes link has been synchronized, and sending a feedback to the sending-side chip when determining that the added SerDes link has been synchronized;
reading, from an original SerDes link and the added SerDes link, alignment words inserted by the sending-side chip, switching a read period of data in the added SerDes link from the short unit frame period into a long unit frame period, and aligning the data of the added SerDes link with data of the original SerDes link according to the alignment words; and
sending, to the sending-side chip, a feedback indicating that the added SerDes link has been aligned with the original SerDes link, and receiving service data over the added SerDes link and the original SerDes link.

9. The receiving-side chip according to claim 8, wherein searching, by the receiving side according to the short unit frame period, for the synchronization word in the added SerDes link comprises:
locking, by the receiving side, a word head in the added SerDes link; and
searching, by the receiving side according to the word head in the SerDes link, for the synchronization word in the added SerDes link in accordance with the short unit frame period.

10. The receiving-side chip according to claim 8, wherein the link information is a total number of currently required SerDes links; and the enabling, by the receiving side according to the link information, a SerDes link to be added comprises:
comparing, by the receiving side, the total number of currently required SerDes links with a number of actually applied SerDes links, and when the total number of currently required SerDes links is greater than the number of actually applied SerDes links, determining that corresponding SerDes links need to be added.

* * * * *